US012717903B2

(12) United States Patent
Salman et al.

(10) Patent No.: US 12,717,903 B2
(45) Date of Patent: Aug. 25, 2026

(54) DETECTING UPLOADS OF MALICIOUS FILES TO CLOUD STORAGE

(71) Applicant: Microsoft Technology Licensing, LLC, Redmond, WA (US)

(72) Inventors: Tamer Salman, Haifa (IL); Andrey Karpovsky, Kiryat Motzkin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 18/066,987

(22) Filed: Dec. 15, 2022

(65) Prior Publication Data

US 2024/0095352 A1 Mar. 21, 2024

Related U.S. Application Data

(60) Provisional application No. 63/376,519, filed on Sep. 21, 2022.

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .... G06F 21/554; G06F 21/562; G06F 21/564; G06F 2221/034; G06F 21/00; G06F 21/552; G06F 21/56; G06F 21/561; G06F 21/565; G06F 21/566; G06F 16/137; G06F 16/14; G06F 16/152
See application file for complete search history.

(56) References Cited

U.S. PATENT DOCUMENTS

| | | | | |
|---|---|---|---|---|
| 9,626,277 | B2 | 4/2017 | Shah et al. | |
| 9,824,216 | B1 * | 11/2017 | Khalid | G06F 21/554 |
| 9,998,484 | B1 | 6/2018 | Buyukkayhan | |
| 10,091,169 | B2 | 10/2018 | Cohen et al. | |
| 10,860,720 | B2 | 12/2020 | Hartnett et al. | |
| 10,901,746 | B2 | 1/2021 | Huang et al. | |
| 10,924,503 | B1 * | 2/2021 | Pereira | H04L 63/20 |
| 11,349,865 | B1 | 5/2022 | Satpathy | |

(Continued)

OTHER PUBLICATIONS

International Search Report and Written Opinion received for PCT Application No. PCT/US23/031102, Nov. 30, 2023, 14 pages.

(Continued)

*Primary Examiner* — Alexander Lagor
*Assistant Examiner* — Taylor P Vu
(74) *Attorney, Agent, or Firm* — Pillsbury Winthrop Shaw Pittman LLP

(57) ABSTRACT

Files uploaded to a cloud storage medium are considered. The files may include a mixture of files known to be malicious and known to be benign. The files are clustered using similarity of file features, e.g., based on distance in a feature space. File clusters may then be used to determine a threat status of an unknown file (a file whose threat status is unknown initially). A feature of the unknown file in the feature space is determined, and a distance in the feature space between the file and a file cluster is calculated. The distance between the unknown file and the file cluster is used to determine whether or not to perform a deep scan on the unknown file. If such a need is identified, and the deep scan indicates the unknown file is malicious, a cybersecurity action is triggered.

21 Claims, 6 Drawing Sheets

(56) References Cited

U.S. PATENT DOCUMENTS

| | | | | |
|---|---|---|---|---|
| 2009/0013405 | A1* | 1/2009 | Schipka | G06F 21/562 726/22 |
| 2009/0089880 | A1* | 4/2009 | Kobayashi | G06F 21/56 711/E12.103 |
| 2012/0017275 | A1* | 1/2012 | Harmonen | G06F 21/56 726/24 |
| 2017/0193229 | A1* | 7/2017 | RoyChowdhury | G06F 21/564 |
| 2017/0206353 | A1* | 7/2017 | Jai | G06F 21/565 |
| 2018/0096230 | A1* | 4/2018 | Luan | G06F 18/24137 |
| 2018/0203998 | A1* | 7/2018 | Maisel | G06F 21/56 |
| 2019/0173897 | A1* | 6/2019 | Okano | G06F 21/552 |
| 2019/0230098 | A1* | 7/2019 | Navarro | H04L 63/1433 |
| 2019/0311121 | A1* | 10/2019 | Martin | H04L 63/1441 |
| 2020/0057854 | A1* | 2/2020 | Wojnowicz | G06N 7/01 |
| 2020/0151565 | A1* | 5/2020 | Widerhorn | G06N 20/10 |
| 2020/0159925 | A1* | 5/2020 | Parlak | G06F 21/53 |
| 2021/0004649 | A1 | 1/2021 | Luan | |
| 2021/0141896 | A1* | 5/2021 | Streit | G06F 21/32 |
| 2023/0110049 | A1* | 4/2023 | Bhalerao | G06F 21/554 726/22 |
| 2023/0164164 | A1* | 5/2023 | Herzberg | H04L 63/1416 726/1 |

OTHER PUBLICATIONS

"Cisco Secure Workload User Guide", Retrieved From: https://www.cisco.com/c/en/us/td/docs/security/workload_security/secure_workload/user-guide/3_7/cisco-secure-workload-user-guide/forensics.html#concept_535093, Sep. 19, 2022, 50 Pages.
"How do AV scanners in VirusTotal check if a file is malicious or not and how trustworthy is its report?", Retrieved From: https://security.stackexchange.com/questions/213371/how-do-av-scanners-in-virustotal-check-if-a-file-is-malicious-or-not-and-how-tru, Nov. 28, 2022, 3 Pages.
"MachineLearning/Anomalous. 100%", Retrieved From: https://web.archive.org/web/20221021235443/https://www.malwarebytes.com/blog/detections/machinelearning-anomalous-100, Oct. 21, 2022, 6 Pages.
Curwin, et al., "Get behavioral analytics and anomaly detection", Retrieved From: https://learn.microsoft.com/en-us/defender-cloud-apps/anomaly-detection-policy, Nov. 7, 2022, 13 Pages.
Curwin, "Threat protection policies", Retrieved From: https://learn.microsoft.com/en-us/defender-cloud-apps/policies-threat protection, Jul. 28, 2022, 11 Pages.
Krieger, et al., "Overview of Microsoft Defender for Storage", Retrieved From: https://learn.microsoft.com/en-us/azure/defender-for-cloud/defender-for-storage-introduction, Nov. 3, 2022, 9 Pages.
Lewis, Matt, "Machine Learning for Static Analysis of Malware—Expansion of Research Scope", Retrieved From: https://research.nccgroup.com/2022/01/31/machine-learning-for-static-analysis-of-malware-expansion-of-research-scope/, Jan. 31, 2022, 17 Pages.
Mansheim, et al., "Enable Microsoft Defender for Storage", Retrieved From: https://learn.microsoft.com/en-us/azure/storage/common/azure-defender-storage-configure?tabs=per-storage-account#set-up-microsoft-defender-for-cloud, Nov. 20, 2022, 8 Pages.
"MachineLearning/Anomalous Detections and Explanation", Retrieved From: https://forums.malwarebytes.com/topic/238670-machinelearninganomalous-detections-and-explanation/, Oct. 31, 2018, 5 Pages.
Rowe, et al., "Finding Anomalous and Suspicious Files from Directory Metadata on a Large Corpus", In 3rd International Conference on Digital Forensics and Cyber Crime, Oct. 26, 2011, pp. 115-130.
Shash, et al., "Using Machine Learning for Log Analysis and Anomaly Detection: A Practical Approach to Finding the Root Cause", Retrieved From https://dzone.com/articles/using-machine-learning-for-log-analysis-and-anomal, Dec. 14, 2022, 9 Pages.
International Preliminary Report on Patentability received for PCT Application No. PCT/US23/031102, Apr. 3, 2025, 09 pages.

* cited by examiner

DETECTING UPLOADS OF MALICIOUS FILES TO CLOUD STORAGE

CROSS-REFERENCE TO RELATED APPLICATION

This application claims the benefit of U.S. provisional application No. 63/376,519 filed on Sep. 21, 2022, entitled "DETECTING UPLOADS OF MALICIOUS FILES TO CLOUD STORAGE," the entirety of which is hereby incorporated by reference herein.

TECHNICAL FIELD

The present disclosure pertains to cloud cybersecurity, and in particular to methods, systems and computer programs for detecting malicious files uploaded to cloud storage.

BACKGROUND

Cybersecurity technology may be used to detect and mitigate (e.g., report and/or remediate) potentially suspicious behavior within or otherwise pertaining to computer infrastructure, such as a computer device or a system of networked computer devices. For example, in a cloud-computing context, a cybersecurity detector may be deployed to detect a behaviour pattern indicative of malicious or otherwise potentially suspicious activity within cloud computing infrastructure (such as a potentially suspicious attempt to access a certain resource).

Cloud computing presents specific cybersecurity challenges. A cloud computing platform typically serves multiple users or 'tenants', with cloud computing resources allocated to different users based on hardware virtualization. Users can upload files (executables, data etc.) to the cloud computing platform, and an operator of the cloud computing platform may have limited control over this. In the event a malicious file is uploaded by a user, that threat will generally be contained to that user's allocated virtual infrastructure (not the wider cloud platform). It is nevertheless prudent for a cloud operator to have cybersecurity detection and mitigation mechanisms in place, in the event one of their users intentionally or inadvertently uploads a malicious file.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

In one or more example embodiments, files uploaded to a cloud storage medium are considered. The files may include a mixture of files known to be malicious and known to be benign. The files are clustered using similarity of file features, e.g., based on distance in a feature space. File clusters may then be used to determine a threat status of an unknown file (a file whose threat status is unknown initially). A feature of the unknown file in the feature space is determined, and a distance in the feature space between the file and a file cluster is calculated. The distance between the unknown file and the file cluster is used to determine whether or not to perform a deep scan on the unknown file. If such a need is identified, and the deep scan indicates the unknown file is malicious, a cybersecurity action is triggered. The term 'file' is used broadly and encompasses any form of data object.

BRIEF DESCRIPTION OF FIGURES

Illustrative embodiments will now be described, by way of example only, with reference to the following schematic figures, in which.

DETAILED DESCRIPTION

Figure 1:
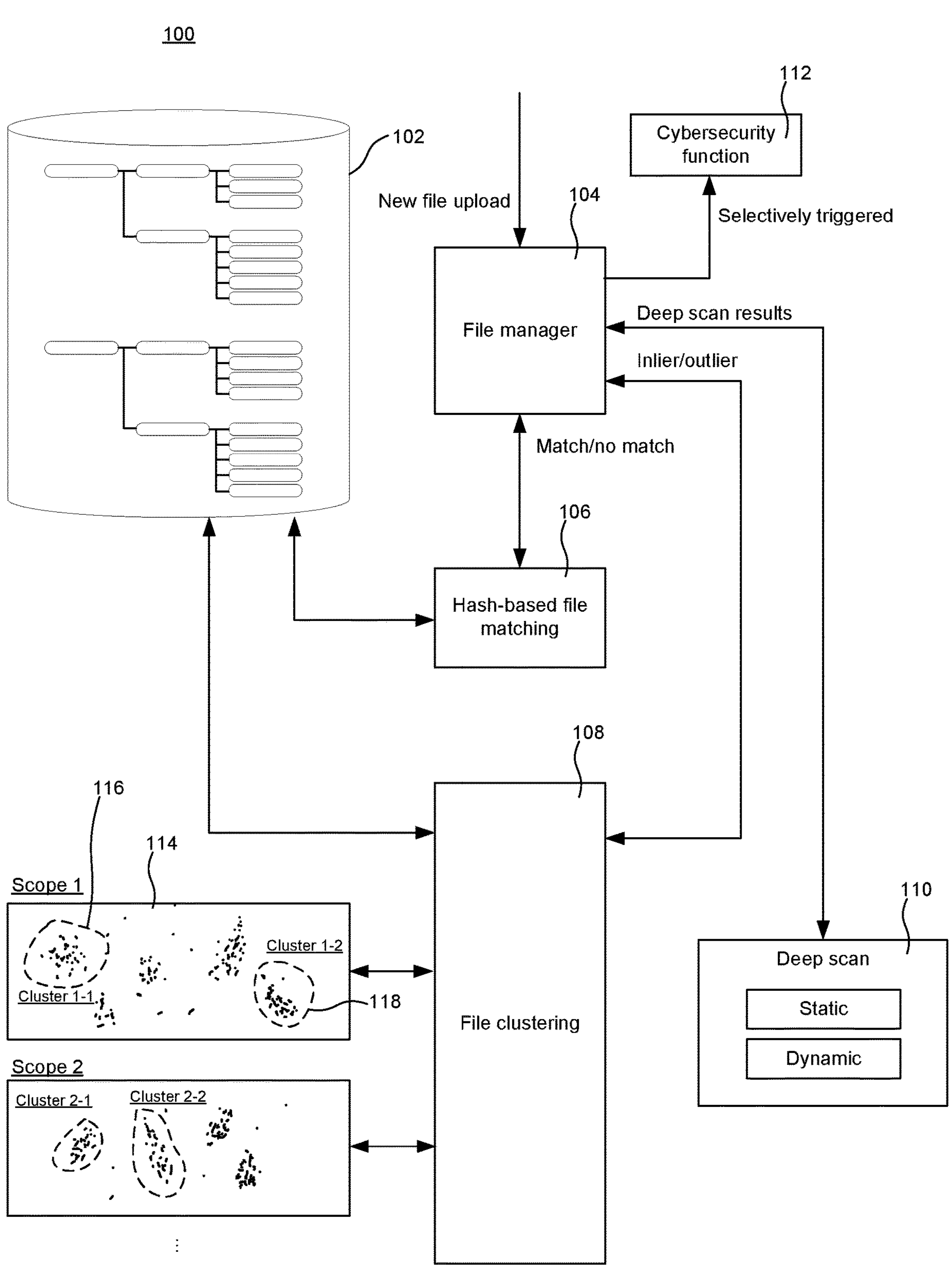
FIG. 1 shows a schematic block diagram of a storage management system.

Malware detection is an important part of any security feature that is used to monitor storage resources, such as cloud storage resources. Malware detection may be performed using a spectrum of techniques, ranging from simple (e.g. comparing uploaded file hashes to list of known malware hashes) to an advanced 'deep scan' analysis (e.g. static deep scan based on content analysis, or dynamic deep scan based on detonation of file content in isolated vault). Dynamic analysis may, for example, involve executing an executable file in an isolated execution environment, with varying degrees of complexity (in a full dynamic analysis, every possible execution path of the executable is considered, which is very reliable but also very expensive in terms of computational resources; other forms of dynamic analysis might consider only certain execution paths, at the risk of a malicious file managing to evade detection). Both static and dynamic deep scans come with a high resource cost, and are consequently slow, compared to simple hash-based file matching. However, whilst simpler techniques, such as hash-based matching are inexpensive and fast, they are inaccurate—for example, new, obfuscated or morphing malware won't be detected. More advanced techniques offer better accuracy but can be costly and invasive.

By way of example, the following analysis methods are considered: (1) "footprint" (hash-based matching), which involves comparing hash representation of file content to a list of hashes belonging to known malware; (2) static analysis, which involves analyzing the file content for suspicious text patterns; (3) dynamic analysis, which involves analyzing runtime behavior of the file in safe environment for suspicious behavior; and (4) full concolic analysis, which involves throughout execution of file in a safe environment in order to examine all potential paths of execution for potential suspicious signals. Method (1) is the cheapest and quickest, but least accurate/reliable, whereas method (4) is highly reliable, but very costly.

Herein, a novel malware detection mechanism is described, which provides a higher level of malware detection accuracy within a given resource budget; or, to put it another way, which is able to achieve a given level of malware detection accuracy with fewer computational resources, this improving the functioning of a computer device performing the malware detection through better management of computational resources. The improvement is achieved via improved targeting of deep scans. Deep scans are generally only performed on certain files, but those files are chosen so as to maximize the usefulness of the deep scans.

Files uploaded to cloud storage are clustered based on features (e.g., metadata) associated with the files or traffic relevant to the files (e.g. sources of upload). A cluster is assigned a threat tag based on its member files. A threat tag may be categorical or numerical. For example, a cluster may be assigned a binary threat tag, whereby a cluster is tagged as malicious or non-malicious. Tagging cluster may result in at least one malicious file cluster and at least one non-malicious file cluster, or another form of categorical threat tag (e.g., a 'low', 'medium', 'high' threat level etc.). As another example, a cluster may be assigned a threat tag in the form of a cluster threat probability (such as a probability that the file cluster is malicious, or a probability that the file cluster is benign). More generally, a threat tag may take the form of a numerical threat score denoting a relative threat level of a file cluster.

When a new file is uploaded to cloud storage, the distance to its nearest cluster is determined. Broadly speaking, that distance is used with the tag of the nearest cluster (malicious/non-malicious) to choose one of the following actions: (1) classify the file as malicious, (2) classify the file as benign or (3) perform a deep scan on the file to determine whether it is malicious (in some implementations, there are additional factors in the decision as to whether to deep scan a file, as explained below).

FIG. 1 shows a highly schematic block diagram of a storage management system 100 equipped with cybersecurity functionality. In this example, the storage management system 100 is deployed within a cloud computing platform in order to manage filed uploaded by users of the cloud platform. Note, the term file is used broadly to mean any form of data item or storage object.

Files are stored in file storage 102, which may for example comprise a database or multiple databases in which files uploaded to the cloud platform are stored. At the hardware level, the file storage 102 may be implemented any form of cloud storage media (localized or distributed).

The storage management system 100 is shown to comprise a file manager 104, a file matching component 106, a clustering component 108, a deep scan component 110 and a cybersecurity component 112. The file manager 104, the file matching component 106, the clustering component 108, the deep scan component 110 and the cybersecurity component 112 are functional components of the storage management system 100, which may be implemented in software, dedicated hardware or any combination thereof.

In the depicted embodiment, the deep scan component 110 is capable of implementing both static and dynamic analyses (here, 'dynamic analysis' includes full concolic analysis and/or a more limited analysis of runtime behavior in a safe execution environment). In another embodiment, the deep scan component 110 may perform only static analysis. In yet another embodiment, the deep scan component 110 may perform only dynamic analysis.

Files may be stored (or at least organized) in a hierarchical (or somewhat hierarchical) manner, which may, for example, be specific to the cloud computing platform. For example, each file may be associated with a particular container object (such as a folder, or a container similar to a folder), and each container object may in turn be associated with a particular cloud account (e.g. an individual user account, organization account etc.). The extent of hierarchical organization may vary between different cloud computing platforms. For example, files under a given user account may be stored in a flat (non-hierarchical) organization of containers (or 'buckets'; flat in the sense that buckets do not contain other buckets).

Files stored in the file storage 102 may be separated into different 'scopes', where a scope could for example be a particular storage resource group, a particular account (e.g. user, organization etc.) or a particular container object (or set of multiple container objects). Scopes can be determined in different ways, but it is generally assumed that files within the same scope have a degree of mutual similarity. A scope may, for example, be a bucket or a set of multiple buckets. Alternatively or additionally, virtual scopes may be used to separate files. Examples of virtual scopes include folders or file paths. Higher-level scopes (such as subscriptions or tenants) could also be used (although lower-level scopes may be more useful in certain contexts). Soft scopes, such as resources manually tagged with same identifiers can alternatively or additionally be used to separate files. In some implementations, scopes may be multi-faceted (e.g. a scope may be defined by any two or more of the aforementioned elements).

In the following examples, multiple scopes are considered, where each scope is associated with a subset (that is, only some) of the files stored in the file storage 102.

Each file held in the file storage 102 is associated with a set of metadata specific to that file. The set of metadata may, for example, be wholly or partly specific to the cloud computing platform. Such metadata may, for example, be stored in association with the file (e.g. externally or in a file header), be desirable from the file, or derivable from the way in which the file is stored, accessed or used. The metadata is encapsulated in one or more features of the file, where each feature is a variable (or 'dimension') whose value can be compared the values of other files in that dimension. These features are said to be 'cloud-enriched', as they embody information that is (at least to some extent) specific to the cloud computing environment in which they are stored.

For example, such metadata might contain information about one or more of the following naming convention of scopes and/or file paths; one or more file properties such as filetype, size, content entropy, header summary etc.; access patterns such as authentication used for accessing the file, upload source (e.g. source IP address associated with the file); and one or more resource properties, such as other connected resources, enabled policies etc.

By way of example, information contained in the file metadata might include an identifier or an application used to upload a file, the number of recurring upload attempts on the same scope or across multiple scopes, an activity indicator (indicating activity of the file), and/or a file path depth. A file's features may also include features of neighboring files and/or similarity to neighboring files.

When a new file is uploaded, the file manager 104 first passes the uploaded file to the file matching component 106. The file matching component 106 performs a simple and highly efficient hash-based comparison of the uploaded file with some or all of the existing files in the file storage 102, or more generally with a set of known malicious file hashes. A hash of the file is computed and compared with the known malicious file hashes that are available. A match to another file generally implies an exact match in terms of file content. Hence if that other file is known to be malicious with some level of confidence, the uploaded file can be identified as malicious at this stage with essentially the same level of confidence. Similarly, if that other file is known to be benign with some level of confidence, the uploaded file can be identified as benign at this stage with essentially the same level of confidence.

If the matching component 106 is unable to match the uploaded file to any existing file, that outcome does not necessarily trigger a deep scan. In that case, the file manager 104 first passes the file to the clustering component 108.

The clustering component is responsible for clustering the files within each scope, based on their respective features. Files may be clustered online, or offline, or using a combination of online and offline clustering.

Purely for the sake of illustration, FIG. 1 considers first and second scopes (scope 1 and scope 2), although it will be appreciated there may be a greater number of scopes.

The features are available said to define a feature space (whose dimensionality is equal to the number of features). Files are clustered into one or more file clusters in the feature space based on similarity of their features (files with more similar features are more likely to be assigned to the same file cluster). Files may be clustered using a 'hard' clustering method (each file is assigned to at most one cluster) or 'soft' clustering (a file may be assigned to multiple clusters, e.g. via a cluster probability assigned for each cluster denoting the probability that the file belongs to that cluster). For example, feature similarity may be defined based on a distance metric in the feature space. For example, Euclidian distance or weighted Euclidian distance (e.g. with different weights applied to different feature dimensions) may be used to determine clusters. Various clustering algorithms may be used for this purpose, such as centroid-based clustering (e.g. k-means) clustering, density-based clustering, connectivity-based clustering, grid-based clustering etc. Certain clustering methods use a predetermined distance thresholds (or thresholds) to encode feature similarity (e.g. two files might be assigned to the same cluster because they are within a threshold distance of each other in feature space). Other clustering methods use only relative distance (e.g. k-means clustering attempts to determine an optimal placement of cluster centroids in feature space; in that case, files are assigned to the nearest cluster centroid in feature space and the cluster placement is tuned to minimize variance within clusters).

By way of example, a first file cluster is denoted by reference sign 116, and a second file cluster is denoted by reference sign 118. The first and second clusters 116, 118 are within the first scope in this example.

When the uploaded file is passed to the file clustering component 108, the file clustering component 108 attempts to match the uploaded file to an existing file cluster within the uploaded file's scope based on the same set of features used to cluster the files. For example, the file cluster 108 may determine a distance, within the feature space, between the uploaded file (that is, a point in the feature space defined by the features of the uploaded file) and each cluster within the uploaded file's scope (so, e.g. if the uploaded file belongs to scope 1, the clustering component 108 would try to match the file with each cluster within scope 1). The distance could, for example, be a simple distance to the cluster mean (the point in the feature space corresponding to the average of the files belonging to that cluster), or a weighted distance (e.g. weighted by cluster variance). The same distance threshold may be used to match an uploaded file to a cluster as is used to determine the clusters. Distance may be determined between a file feature (or features) and a file cluster feature (or features). A file cluster feature may, for example, be an average feature of a cluster (e.g. a cluster centroid) or a file feature of an individual file within the cluster (e.g. an uploaded file feature may be compared with file features of some of or files within a cluster).

In a practical setting, it is useful to restrict the cluster-based matching to a specific scope. This approach conserves computing resources, and also clustering logic to run independently for each scope, which in turn provides greater speed/efficiency of processing through parallelization (clustering and cluster-based matching can be parallelized across different scopes). However, in other embodiments, the comparison to clusters could be performed across multiple scopes (or, indeed, across all files if sufficient computing resources are available).

Each file cluster, such as the first and second file clusters 116, 118, is assigned a threat tag. For example, each cluster may be labelled as either malicious or benign; or the cluster may be assigned some other categorical threat level (e.g. low, medium, or high); or the cluster may be assigned a numerical threat score (such as a threat probability).

The file manager 104 uses the outcome of the cluster-based matching in determining whether or not to pass the uploaded file to the deep scan component 110 to perform a deep scan on the uploaded file. Generally, if the uploaded file is matched to an existing cluster with a high level of confidence (that is, the uploaded file is a strong inlier of an existing cluster), a deep scan is fairly unlikely to be informative, as it can generally be concluded on the basis of the clustering that the file is either benign (if it is a strong inlier of a benign file cluster) or malicious (if it is a strong inlier of a malicious file cluster); a deep scan would, in all likelihood, simply confirm the conclusion drawn from the cluster-based matching. In one embodiment, no deep scan is performed on inlier files. In another embodiment, deep scans are performed for only a small percentage of inliers.

On the other hand, if a file cannot be matched to an existing cluster (that is, the uploaded file is an outlier of all clusters within its scope), a deep will generally be much more informative. In one embodiment, all outlier files are deep scanned. In another embodiment, only some outliers are scanned (e.g. as determined by a resource budged), but files in this category are more likely to be deep scanned than strong inliers. For example, the probability of a file being deep scanned may be determined as a function of the extent to which the file is a cluster inlier/outlier (e.g. as a function of distance from the file cluster nearest to the uploaded file in feature space within the applicable scope).

In the event the uploaded file is identified as malicious (via hash-based matching to a known malicious file, via cluster-based matching, or via a deep scan of the uploaded file), the file manager 104 causes the cybersecurity function 112 to perform an appropriate cybersecurity action, such as generating an alert (e.g. accessible to a user who uploaded the file or is otherwise associated with the file), quarantining the uploaded file, purging the uploaded file etc.

Figure 2:
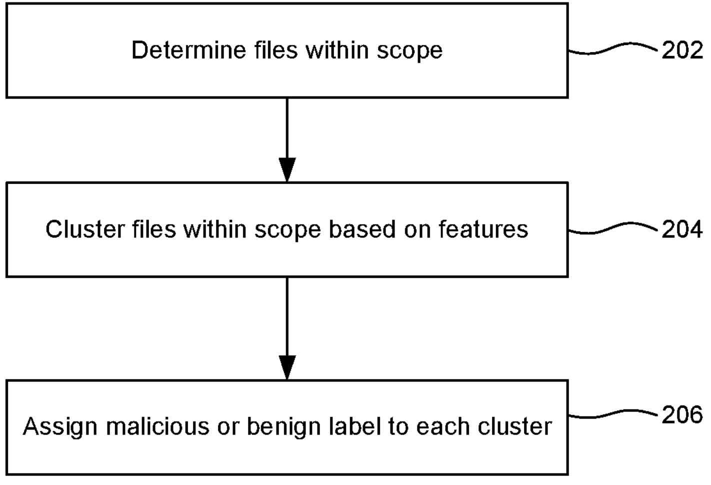
FIG. 2 shows a high-level flowchart for a method of clustering files.

FIG. 2 shows a high-level flow chart for a method of determining a set of file clusters and associated threat tags within a particular file scope.

At Step 202, the clustering component 108 determined a scope of each file to be clustered, and Steps 204 and 206 are applied to each scope independently (to the subset of files within that scope). As noted, separating files into different scopes that are clustered independently is beneficial from a practical implementation perspective, but not essential, and in other embodiments Steps 204 and 206 may be applied to files that span multiple scopes, or across all available files.

At Step 204, the clustering component 108 clusters the files within a given file scope. Clustering is an unsupervised machine learning algorithm based on a distance metric (for example, Euclidian distance, or angular (e.g., cosine) distance etc.) in feature space. In the present example, the file clustering component 108 clusters files using only their features in feature space (which, in this example, does not consider any benign/malicious labels that might have been assigned to the files; in other words, in this example, files are clustered without using knowledge of whether or not the files are malicious or benign, and such knowledge is not required in Step 204). The feature space can be a single feature dimension or a multidimensional feature space (which can accommodate a greater extent of file metadata).

At step 206, following the clustering of step 204, the clustering component 108 assigns each cluster is assigned a threat tag. As noted, the threat tag may be categorial or numerical. In the present example, each cluster is assigned a numerical threat tag, in the form of a threat probability (probabilistic label), either manually, or automatically based on any malicious/benign labels that have been assigned to members of the cluster majority of the members of the cluster.

Because the clustering of step 204 does not take into account knowledge of whether files are malicious or benign, there can be similar files in the same cluster (or even versions of the same file), which have different verdicts. For example, a cluster might include a number of files known to be malicious and a number of files known to be benign (e.g. through deep scanning of those files and/or or through hash-based matching to known malware signatures), as well as a (potentially large) number of files whose threat level is unknown (e.g. because those files do not match any known malware signatures and have not been deep scanned). Threat probabilities and other numerical threat scores can accommodate a situation in which a cluster contains both malicious and benign files, e.g., a cluster that contains 90 malicious files and 10 benign files might be assigned a threat probability of 0.9 (estimated probability of the file cluster being malicious) or 0.1 (estimated probability of the file cluster being benign).

Step 206 may also determine a level of uncertainty in the threat tag. For example, if the cluster contains only a relatively small number of files whose threat properties are known, this may result in a higher level of uncertainty. Uncertainty can be reduced through further analysis (e.g. deep scan) of selected files within a cluster. Uncertainty can, for example, be encapsulated in the threat probability assigned to a cluster. For example, to take an extreme case, a large cluster might contain only a single file whose threat properties are known (with the threat properties of all other files in the cluster being unknown), e.g. a single benign file. That single data point may be insufficient to conclude with certainty that the cluster as a whole is benign. Hence, rather than assigning the cluster a threat probability of, say, 0 (probability that it is malicious) or 1 (probability that the cluster is benign), the cluster may instead be assigned a threat probability closer to 0.5. Hence, the threat probability assigned to a cluster can, where appropriate, take into account not only the respective numbers of malicious/benign files within the cluster, but also the number of files whose threat properties are unknown. Different scoring methodologies can be used to assign clusters an appropriate threat score taking such considerations into account.

The resulting clusters are a form of a heuristic threat model that can subsequently be used to better target deep scan resources. As explained in further detail below, when a new file is received or otherwise obtained, the clustering component 108 matches the file to the clusters within its scope, based on distance in the same feature space. This, in turn, provides a data-driven estimate of the threat level associated with the new file, taking into account the extent it matches an existing cluster (or clusters) and the threat tag(s) of that (or those) clusters.

The steps of FIG. 2 can be performed 'offline' or 'online', or using a combination of online and offline processing. In offline processing, some initial set of files is processed in a batch before the clusters are deployed. In other words, offline files are clustered, and each newly uploaded file is then assigned to an existing cluster.

In an online approach, files are added to clusters (and new clusters may be created) as files are uploaded, either individually or in batches. In an online implementation, Steps 202-206 may therefore be repeated per new file or new batch. Both offline and online approaches would work. Online clustering can also accommodate additional feature(s) based on upload status.

In both offline and online implementation, results of actual scans on uploaded files (whether positive or negative) can be used to flag existing clusters as potentially malicious or benign. In other words, threat tags can be uploaded as further scan are performed in both offline and online implementations.

Figure 3:
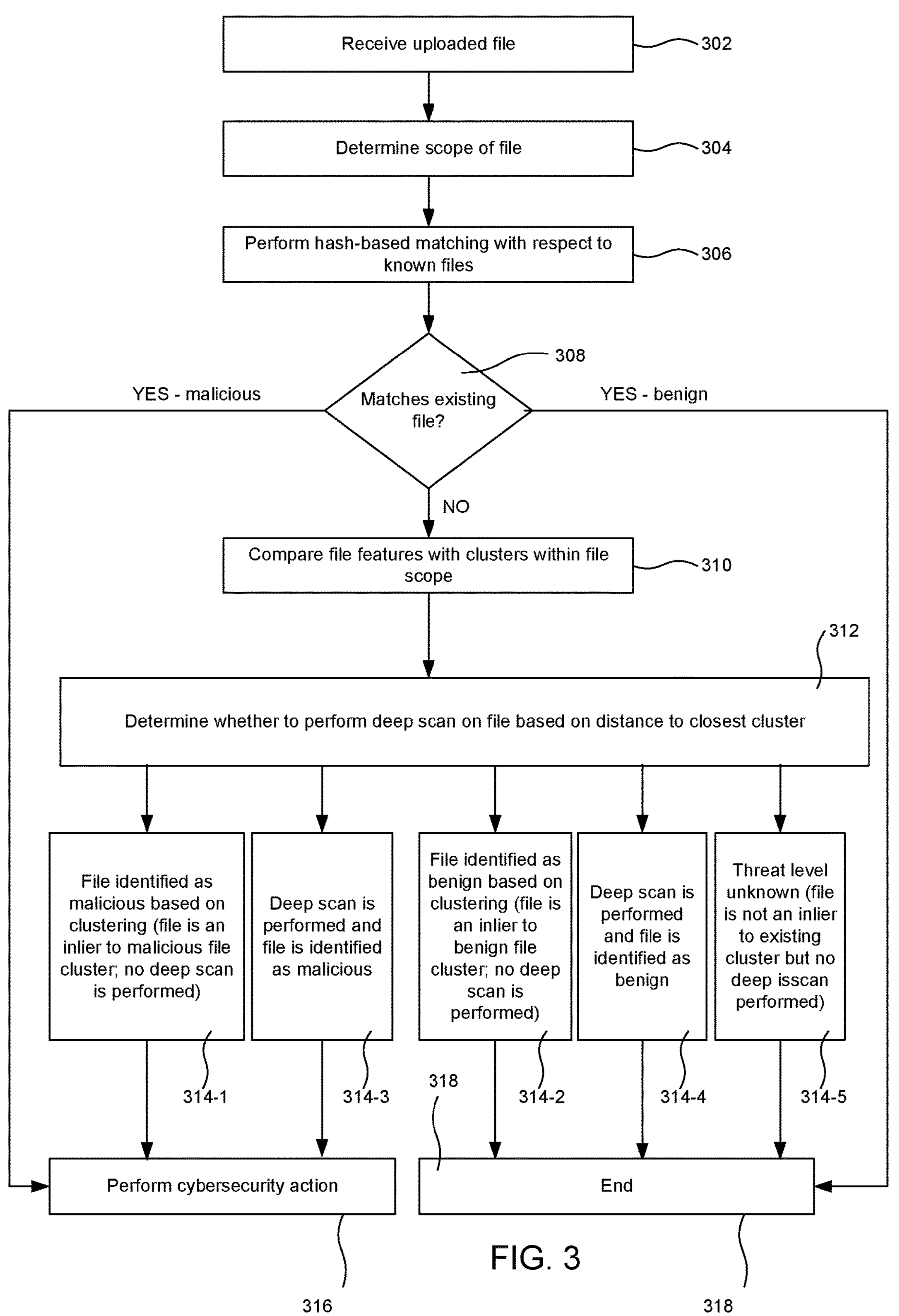
FIG. 3 shows a high-level for a method of malware detection based on selective deep scanning of uploaded files.

FIG. 3 shows a high level flowchart of a malware detection method applied to uploaded files. The method uses selective deep scanning that is informed by cluster-based matching (matching uploaded files to file clusters based on their respective features in feature space and using threat tags assigned to the clusters).

At step 302, the file manager 104 receives a file uploaded to the cloud storage 102.

At step 304, the clustering component determined a scope of the uploaded file.

At step 306, the file manager computes a hash of the uploaded file, and attempts to match the file hash to a set of known file hashes. In the present example, this set includes hashes of both known malicious files and known benign files. If this yields a match to a known malicious file (step 308, 'YES—malicious' branch), the uploaded file is classified as malicious, resulting in an appropriate cybersecurity action (316); on the other hand, if this yields a match to a known benign file (step 308, 'YES—benign' branch), the file is classified as benign, and the method ends (step 318). A positive match to a known malicious or known benign file is taken as definitive, and the analysis ends at that point. However, if there is no positive match at step 306 (step 308, 'NO' branch), the method proceeds to step 310.

At step 310, a set of features of the file is determined in the feature space of the clusters within the file scope determined at step 304, and those features are used to compare the uploaded files to the file clusters within that file scope, within the feature space of the clusters. This cluster-based comparison then informs a decision as to whether to perform a deep scan on the uploaded file (Step 312).

Absent a positive hash match at step 306, there broadly are five possible outcomes:

Outcome 314-1: the uploaded file is strong inlier to a malicious cluster (e.g. a cluster assigned a malicious tag, or a relatively high maliciousness probability), and the file is classified as malicious on that basis, without triggering any deep scan of the file. This triggers a security action at step 316 (in the same way as a positive hash-based match to known malicious file at step 306).

Outcome 314-2: the uploaded file is strong inlier to a benign cluster (e.g. a cluster assigned a benign tag, or a relatively low maliciousness probability) and the file is classified as benign on that basis, without triggering a deep scan. The analysis ends at this point (step 318).

Outcome 314-3: based on the results of the cluster-based matching, a deep scan is triggered, and the deep scan indicated the file to be malicious. This also triggers an appropriate cybersecurity action (step 316).

Outcome 314-4: based on the results of the cluster-based matching, a deep scan is triggered. The deep scan indicated the file to be benign, and the analysis ends (318).

Outcome 314-5: the uploaded file is not a strong inlier to a malicious or benign cluster (or the cluster-based matching is otherwise indeterminate, e.g. because the threat level of the closest file cluster is uncertain). However, no deep scan is performed because of a resource budget constraint (this is discussed in further detail below).

With regards to Outcomes 314-1 and 314-2, in some implementations, some (relatively small) percentage of strong inliers are still deep scanned. If the cluster-based matching indicates a high probability of maliciousness for the uploaded file, a deep scan is unlikely to be informative, as, in all likelihood, a deep scan would simply confirm that the file is, indeed, malicious. That said, in in some implementations, some percentage of uploaded files in this category are deep scanned, as an additional safeguard. This is useful to prevent the formation of 'stale' clusters, particularly if a file cluster has been wrongly tagged as malicious or benign based on an unrepresentative sample of data points. Similarly, if the cluster-based matching indicates a high probability that the uploaded file is benign, again, a deep scan is unlikely to be informative, and the uploaded file can probably be treated as benign. However, a percentage of files in this category may still be deep scanned as an additional safeguard. Such decisions taken may take into account the differing risks of false positives (wrongly classifying a benign file as malicious) and false negatives (wrongly classifying a malicious file as benign). The latter is generally a 'worse' error in the context of cybersecurity. Thus, in some implementations, a higher percentage of likely-benign files may deep scanned than likely-malicious files.

Outcomes 314-3 and 314-3 accommodate not only 'outlier' files, but also the percentage of inlier files that are deep scanned (where applicable).

The hash-based matching of step 306 may or may not use the file scope determined at step 304. The hash-based matching could be restricted to files within the same scope; however, as the hash-based matching is an inexpensive operation, this may be unnecessary, e.g., the hash-based matching could be performed across all known file hashes (in which case, the scope of the file need only be determined for the purpose of the cluster-based matching if the hash-matching gives a negative result).

Figure 4:
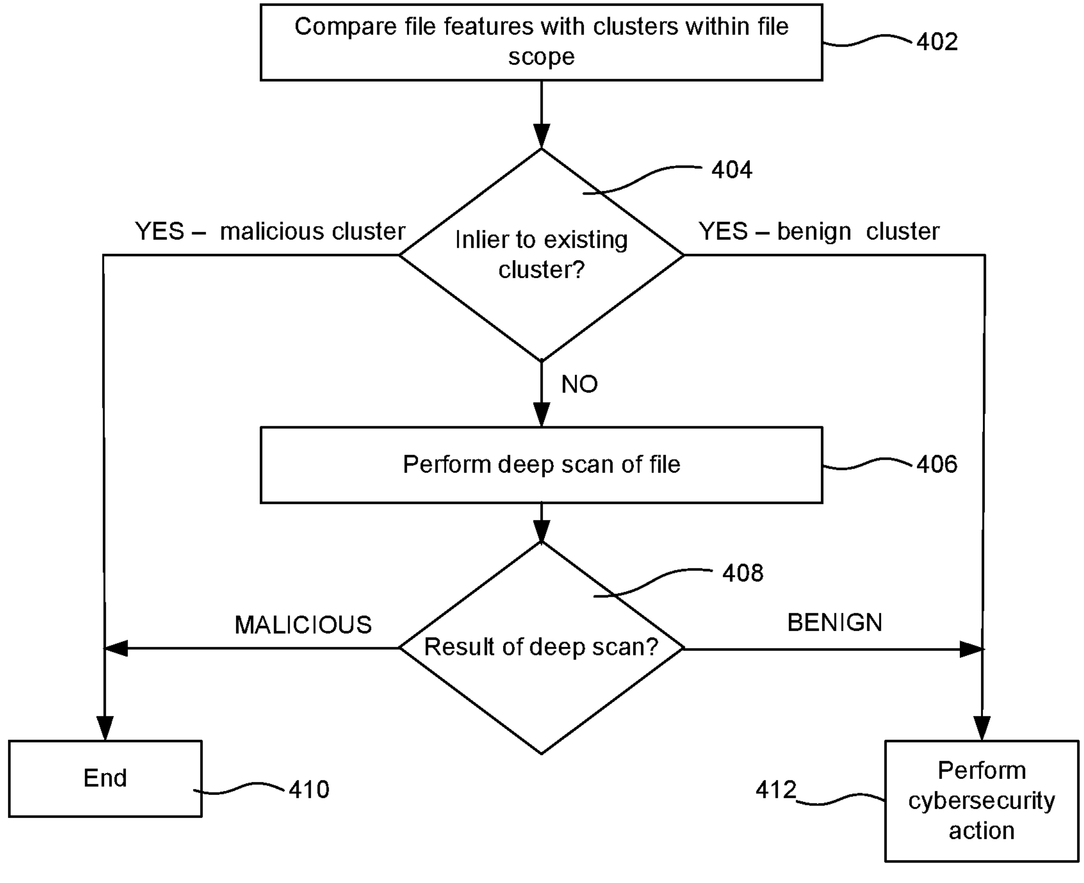
FIG. 4 shows a flow-chart for a malware detection method in a first embodiment.

FIG. 4 shows a typical sequence of decision points performed at step 312. Note that FIG. 4 is intended to provide a high-level overview of a typical sequence of decision points, and is not necessarily exhaustive (FIG. 5 considered a more detailed processing flow in one embodiment, which is described below).

At Step 402, the uploaded file is compared with the clusters within its scope. The comparison is performed by determining a distance in the feature space between the uploaded file and each cluster within its scope. In this embodiment, the uploaded file is assigned to the nearest cluster in feature space (other embodiments are considered below). The nearest cluster means the cluster with the shortest distance on a chosen distance metric, which may be the same distance metric as used to determine file similarity in clustering.

With online clustering (or a combination of offline and online clustering), the file may be added to the nearest cluster for the purpose of analysis on subsequent uploaded files (corresponding to step 204 in an online implementation of FIG. 2).

Step 404 considered three decision branches:

1) The file is a strong inlier to the nearest cluster, the nearest cluster is benign (or likely benign), and a typical outcome in this case is that the file is classified as benign without performing a deep scan on the file, with the analysis terminating at that point (410).
2) The file is a strong inlier to the nearest cluster, the nearest cluster is malicious (or likely malicious), and a typical outcome in this case is that the file is classified as malicious without performing a deep scan on the file, triggering a cybersecurity action at step 412.
3) The cluster-based matching is indeterminate, because the file is an outlier to the nearest cluster and/or it is not known with certainty whether the nearest cluster is malicious or benign, which in turn might result in a deep scan on the file (Step 406).

If a deep scan is performed and indicates the file is malicious, this also triggers a cybersecurity action (step 412). If the deep scan indicates the file is benign, the method terminates at step 412. In either case, this also provides a useful data point for subsequent analyses, and the threat tag of the nearest cluster may therefore be updated to account for the result of the deep scan, for the purpose of analysis on subsequent files.

FIG. 4 provides an overview a simplified implementation that does not take into account all of the considerations described above with reference to FIG. 3.

A further implementation will now be described that is more probabilistic in nature. In this implementation, each uploaded file is assigned a threat probability (or threat score more generally). The threat probability, in turn, is used to calculate a deep scan probability (or other score), which in turn determines the likelihood of a deep scan being performed on the file. The deep scan probability takes into account the certainty with which the file can be classified as benign or malicious. A file assigned a threat probability of 0.5 (50/50 malicious/benign) generally represents maximum uncertainty. Generally speaking, files with higher threat uncertainty are assigned a higher deep scan probability (meaning a lower deep scan probability for a threat score close to 0 or close to 1). The relationship between the deep scan probability and the threat probability may also take into account the differing risks of false positives vs false negatives (as in FIG. 6—see below).

Figure 5:
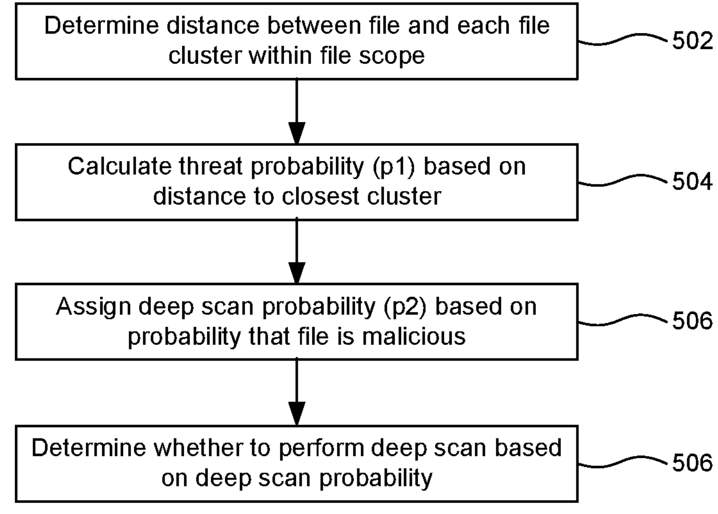
FIG. 5 shows a flow-chart for a malware detection method in a second embodiment.

FIG. 5 shows a flowchart for a probabilistic implementation of the cluster-based analysis.

At step 502, a distance in feature space is determined between each file and each file cluster with the file's scope. The distance between the file and a given cluster indicates how likely it is that the file belongs to that cluster. In this example, the distance is used to compute a probability that the file belongs to its nearest cluster in feature space. In some embodiments, only the nearest cluster is considered. In other embodiments, multiple clusters may be considered. The probability that the file belongs to a given cluster may be denoted mathematically as $p(c\_j|f)$ where f denotes the uploaded file and $c_j$ denotes the jth cluster. The cluster nearest to the file f in feature space is denoted $c_k$.

At step 504, a threat probability (or other threat score) is computed based on at least the distance to the nearest cluster. The threat score may also take into account the distance to one or more other clusters if the cluster assignment is probabilistic. For each of illustration, it is assumed the file is assigned a probability of maliciousness (1 denoting malicious, and 0 denoting benign). However, this is an arbitrary choice, and the method could instead assign a probability that the file is benign (or any other numerical threat score).

For example, in one embodiment the file is assigned a threat probability $p1=p(m|f)=p(m|c\_k)*p(c\_k|f)$, where $p(c\_k|f)$ is the probability that the file f belongs to the nearest cluster and $p(m|c\_k)$ is the probability that the nearest cluster is malicious. In another embodiments, multiple clusters may be considered and the threat score p1 may, for example, be determined as $p(m|c\_k)*p(c\_j|f)$ summed over multiple clusters c_j (including the nearest cluster c_k), e.g. summed over all clusters within the file's scope.

At step 506, the threat probability p1 is used to determine a deep scan probability, p2.

Figure 6:
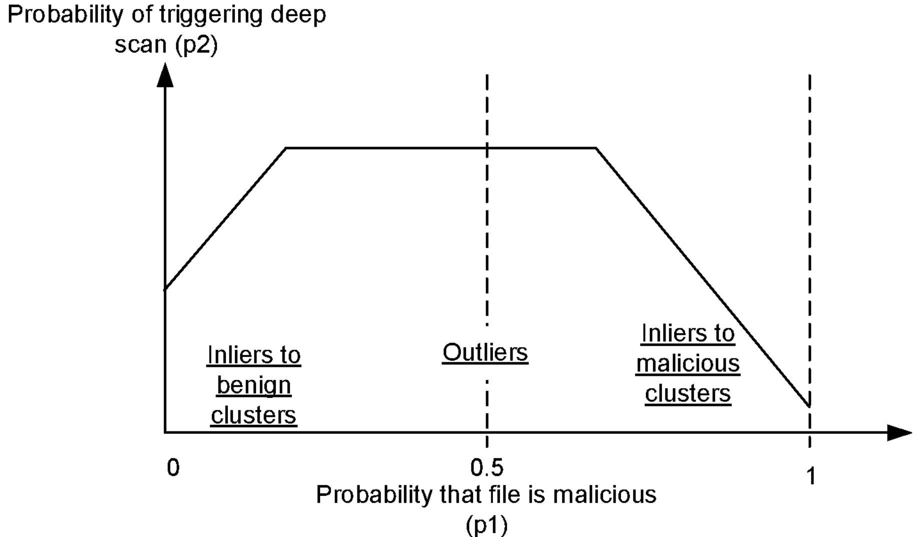
FIG. 6 shows a graph illustrating a relationship between a deep scan probability and a threat probability.

FIG. 6 shows an example of a possible relationship between the threat probability p1 and the deep scan probability p2. In this case, the deep scan probability p2 generally reduces as p1 approaches zero and as p1 approaches one. Broadly speaking, outlier files (p1 close to 0.5) are more likely to be scanned. However, in this case, the relationship between p1 and p2 is biased, to favor deep scans on likely-benign files (p1 close to 0) compared with likely-malicious files (p1 close to 1; that is, the reduction in p2 as p1 approaches zero is less extreme than the reduction in p2 as p1 approaches one. This biasing accounts for the higher risk posed by false negative detections (wrongly classifying a malicious file as benign) compared with false positives (wrongly classifying a benign file as malicious). By way of example, FIG. 6 shows a maximum at p1=0.5, but this is not essential. For example, something closer to 80/20 biasing may be used. More generally, the relationship between the threat probability p1 and the deep scan probability p2 can encapsulate any desired goal, allowing deep scan resources to be constrained and targeted appropriately (e.g. within a given resource budget—see below).

Although FIG. 6 depicts a gradual reduction in p2 and p1 approaches zero and one, discrete cutoff thresholds could be used instead (e.g., predefined thresholds).

At step 506, a decision is taken as to whether to perform a deep scan on the file. This decision uses the deep scan probability p2. The lower the value of p2, the less likely the file is to be deep scanned at Step 506.

The relationship between p1 and p2 can be used to enforce a selected resource budget, as this relationship determines the overall percentage of uploaded files that will be deep scanned in practice. Note that the maximum value of p2 is not necessarily 1, e.g. in FIG. 6 p2 has its maximum value when p1=0.5, but this maximum value of p2 may be less than 1. In this case, deep scans are not performed on all files with p1 close to 0.5, but only some percentage of those files, meaning that no file is guaranteed to be deep scanned (corresponding Outcome 314-5 in FIG. 3). This may be necessary to enforce a given resource budget.

Whilst the method of FIG. 4 and FIG. 5 are described in relation to a particular file scope, as noted, in other embodiments, the steps may not be restricted to a single file scope.

Figure 7:
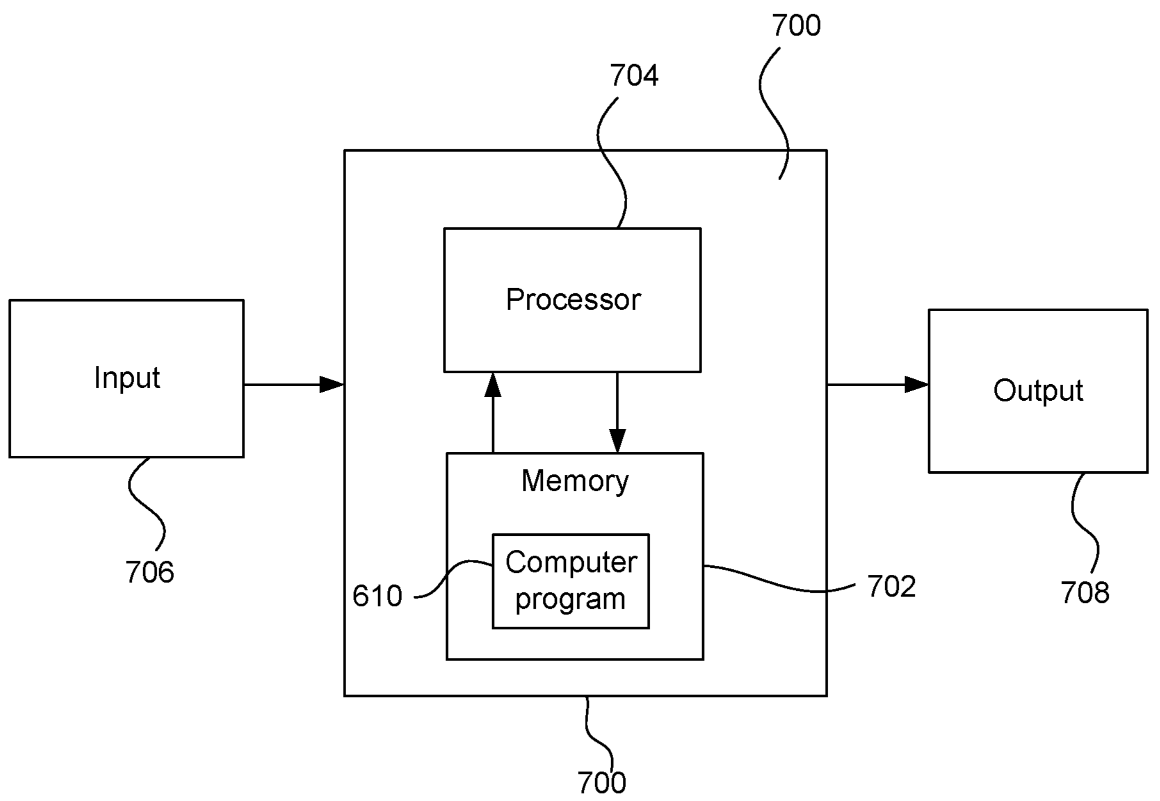
FIG. 7 shows a schematic block diagram of a computer device.

FIG. 7 is a schematic block diagram of an example computer system 700 on which the methods/functions describe above can be implemented. The computer system 700 comprises a memory 702 and a processor 704 coupled to the memory 702, such as a CPU. A computer program 610, comprising computer executable instructions, is stored in the memory 702 for execution on the processor 704. The computer system 700 may be configured, in executing the computer program 610, to implement the functional components of FIG. 1, or carry out the methods of any of FIGS. 2-4. An input 706 to the computer system may for example comprise a file uploaded to cloud storage. An output 708 may be outputted as part of a mitigation action, a could for example comprise a security alert. In some examples, computer executable instructions are provided using any computer-readable media that are accessible by the computing equipment. Computer-readable media include, for example, computer storage media such as memory and communications media. Computer storage media include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory) is shown within the computing equipment, it will be appreciated by a person skilled in the art, that, in some examples, the storage is distributed or located remotely and accessed via a network or other communication link (e.g., using a communication interface).

The operations described herein may be performed on a single processor, or distributed across multiple processors (in a single computing device or multiple computing devices). In this respect, references to 'at least one processor' configured to carry out given operations includes the case of a single processor configured to perform all of those operations (e.g. a single processor coupled to a single memory that embodies computer-readable instructions for carrying out all of those operations, as in FIG. 7), but also the case of multiple processors where each processor is configured to carry out only one or only some of those operations (e.g. where each processor is coupled to a respective memory containing computer-readable instructions for carrying out that/those operations only) such that the recited operations are distributed across multiple processors. Similarly, the terminology 'at least one memory configured to store computer-readable instructions' includes the case of a single memory storing all of those instructions, or multiple memories where each memory stores only some of those instructions (such that the computer-readable instructions are distributed across multiple memories). The same considerations apply more generally to any references herein to at least one element, unless context demands otherwise.

Claims

According to a first aspect herein, a computer system comprise: at least one memory embodying computer-readable instructions; and at least one processor coupled to the at least one memory and configured to execute the computer-readable instructions, the computer-readable instructions being configured, upon execution by the at least one processor, to cause the at least one processor to: determine file clusters from a plurality of files uploaded to a cloud storage medium, the file clusters grouped using distance between files in a feature space, the plurality of files comprising a first set of files known to be malicious and a second set of files known to be benign; obtain a first file uploaded to the cloud storage medium; determine a first feature of the first file in the feature space; determine a first distance in the feature space between the first file and a first file cluster of the file clusters, the first distance based on the first feature of the first file and a file cluster feature of the first file cluster; based on the first distance between the first file and the first file cluster, identify a need to perform a deep scan on the first file; perform the deep scan on the first file; and responsive to the deep scan indicating the first file is malicious, cause a cybersecurity action to be performed.

The file clusters may be assigned a tag that indicates if an individual file cluster is malicious or benign. The computer-readable instructions may be configured to cause the at least one processor to: assign to the first file a first threat score based on the first distance and the tag assigned to the first cluster, and assign to the first file a deep scan score based on the first threat score, wherein the deep scan score is used to identify the need to perform the deep scan.

The threat score may be assigned based on the first distance to the first cluster and a second distance between the first file and a second cluster of the plurality of file clusters.

The file clusters may be assigned a tag indicating whether an individual file cluster is malicious or benign, and the computer-readable instructions may be configured to cause the at least one processor to: obtain a second file uploaded to the cloud storage medium, determine a second feature of the second file in said feature space, determine a second distance in said feature space between the second file and a second file cluster of the plurality of file clusters that is closest to the second file in said feature space, the second distance based on the second feature of the second file and a second file cluster feature of the second file cluster; based on the second distance between the second file and the second closest file: i) determine that no deep scan needs to be performed on the second file, and ii) classify the second file as malicious or benign based on the tag assigned to the second cluster.

The second cluster may be assigned a malicious tag, the second file may be classified as malicious, and a second cybersecurity action may be performed responsive to classifying the second file as malicious.

The feature may be specific to the cloud storage medium or a cloud computing platform hosting the cloud storage medium.

The plurality of file clusters may be associated with a first scope, a plurality of second file clusters associated with a second file scope may be determined, and the computer-readable instructions may be configured to cause the at least one processor to: match the first file with the first scope. The distance between the first file and the first file cluster of the plurality of file clusters associated with the first scope may be determined responsive to matching the first file with the first scope.

The deep scan may comprise a static analysis of code contained within the first file.

The deep scan may comprise executing code of the first file within an isolated execution environment and analyzing runtime behavior of the code.

The computer-readable instructions may be configured to cause the at least one processor to: compare a hash of the first file with known malicious hashes, wherein the need to perform the deep scan may be determined based on: (i) a determination that the hash of the file does not match any known malicious hash, and (ii) the first distance between the first file and the first file cluster.

The first cluster may be closest to the first file in said feature space.

The deep scan may be performed on the first file responsive to determining that the first distance is below a predefined threshold.

In a second aspect, a computer-implemented method comprises: obtaining a data object uploaded to cloud computing storage; determining a feature of the data object in a feature dimension; determining a first distance between the data object and a first data object cluster, the first distance based on the feature of the data object and a first object cluster feature in the feature dimension of the first data object cluster; determining a second distance between the data object and a second data object cluster, the second distance based on the feature of the data object and a second object cluster feature in the feature dimension of the second data object cluster, the first data object cluster and the second data object cluster having been determined from a plurality of data objects uploaded to the cloud computing storage based on distance between data objects in the feature dimension, the plurality of data objects comprising a first data object known to be malicious and a second data object known to be benign; based on the first distance and the second distance, identify a need to perform a deep scan is on the data object; performing the deep scan on the data object; and responsive to the deep scan indicating the data object is malicious, triggering a cybersecurity response.

The data object cluster and the second data object cluster may be determined based on distance in the feature dimension.

A plurality of features of the data object may be determined in a plurality of feature dimensions, and the first distance and the second distance may be determined in the plurality of feature dimensions.

The first data object cluster may be assigned a first tag that indicates if the first data object cluster is malicious or benign, and the method may comprise: assigning to the data object a threat score based on the first distance, the second distance and the first tag assigned to the first cluster; and assigning to the data object a deep scan score based on the threat score, wherein the deep scan score is used to identify the need to perform the deep scan.

The threat score may be assigned to the data object based on the first tag responsive to determining that the first distance is less than the second distance.

The second data object cluster may be assigned a second tag that indicates if the second data object cluster is malicious or benign. The first distance may be used to determine a first probability of the data object belonging to the first data object cluster, the second distance may be used to determine a second probability of the data object belonging to the second data object cluster, and the threat score may be assigned based on the first tag, the first probability, the second tag and the second probability.

A third aspect herein provides computer-readable storage media embodying computer-readable instructions configured, when executed by at least one processor, to cause the at least one processor to: determine file clusters from a plurality of files uploaded to a cloud storage medium, the file clusters determined based on distances between files in a feature space, the files comprising a first set of files known to be malicious and a second set of files known to be benign; obtain a first file uploaded to the cloud storage medium; determine a first feature of the first file in the feature space; determine a first distance in the feature space between the first file and a first file cluster of the file clusters, the first distance based on the first feature of the first file and a file cluster feature of the first file cluster; based on the first distance between the first file and the first file cluster, identify a need to perform a deep scan on the first file; perform the deep scan on the first file; and responsive to the deep scan indicating the first file is malicious, cause a cybersecurity action to be performed.

The file clusters may be assigned a tag that indicates if an individual file cluster is malicious or benign, wherein the computer-readable instructions are configured to cause the at least one processor to: assign to the first file a first threat score based on the first distance and the tag assigned to the first cluster, and assign to the first file a deep scan score based on the first threat score, wherein the deep scan score is used to identify the need to perform the deep scan.

Whilst various embodiments are described above, it will be appreciated these are illustrative and not exhaustive. The scope of the present disclosure is not defined by the described embodiments, but only by the accompanying claims.

The invention claimed is:

1. A computer system comprising:

a memory embodying computer-readable instructions; and a processor coupled to the memory and configured to execute the computer-readable instructions, the computer-readable instructions being configured, upon execution by the processor, to cause the processor to:

determine a first file cluster from a plurality of files uploaded to a cloud storage medium, the first file cluster grouped using distance between files in a feature space, the plurality of files comprising a file known to be malicious and a file known to be benign;

obtain a first file uploaded to the cloud storage medium;

determine a first feature of the first file in the feature space;

determine a first distance in the feature space between the first file and the first file cluster, the first distance based on the first feature of the first file and a file cluster feature of the first file cluster;

assign a threat probability to the first file based on the first distance between the first file and the first file cluster;

determine a deep scan probability for the first file utilizing the threat probability, wherein the deep scan probability is biased against false negatives to favor performing a deep scan on likely-benign files as compared with likely-malicious files;

perform the deep scan on the first file in response to the deep scan probability being above a threshold, wherein the deep scan comprises executing code of the first file within an isolated execution environment and analyzing runtime behavior of the code; and responsive to the deep scan indicating the first file is malicious, cause a cybersecurity action to be performed.

2. The computer system of claim 1, wherein the first file cluster is assigned a tag that indicates if the first file cluster is malicious or benign, wherein the computer-readable instructions are configured to cause the processor to:

assign the threat probability to the first file based on the first distance and the tag assigned to the first file cluster.

3. The computer system of claim 1, wherein the threat probability is assigned based on the first distance to the first file cluster and a second distance between the first file and a second file cluster.

4. The computer system of claim 1, wherein the first file cluster is assigned a tag indicating whether the first file cluster is malicious or benign, wherein the computer-readable instructions are configured to cause the processor to:

obtain a second file uploaded to the cloud storage medium;

determine a second feature of the second file in said feature space;

determine a second distance in said feature space between the second file and a second file cluster that is closest to the second file in said feature space, the second distance based on the second feature of the second file and a second file cluster feature of the second file cluster; and based on the second distance between the second file and the second file cluster:

i) determine that no deep scan needs to be performed on the second file, and ii) classify the second file as malicious or benign based on the tag assigned to the second file cluster.

5. The computer system of claim 4, wherein the second file cluster is assigned a malicious tag, the second file is classified as malicious, and a second cybersecurity action is performed responsive to classifying the second file as malicious.

6. The computer system of claim 1, wherein the first feature is specific to the cloud storage medium or a cloud computing platform hosting the cloud storage medium.

7. The computer system of claim 1, wherein the first file cluster is associated with a first scope, wherein a second file cluster associated with a second file scope is determined, wherein the computer-readable instructions are configured to cause the processor to:

match the first file with the first scope, wherein the first distance between the first file and the first file cluster associated with the first scope is determined responsive to matching the first file with the first scope.

8. The computer system of claim 1, wherein the deep scan comprises a static analysis of code contained within the first file.

9. The computer system of claim 1, wherein the computer-readable instructions are configured to cause the processor to:

compare a hash of the first file with known malicious hashes, wherein a need to perform the deep scan is determined based on:

(i) a determination that the hash of the first file does not match any known malicious hash, and (ii) the first distance between the first file and the first file cluster.

10. The computer system of claim 1, wherein the first file cluster is closest to the first file in said feature space.

11. The computer system of claim 1, wherein the deep scan comprises executing every potential execution path of the first file.

12. The computer system of claim 1, wherein a first value of the threat probability indicates a benign file and a second value of the threat probability indicates a malicious file, wherein a reduction in the deep scan probability as the threat probability approaches the first value is less than a reduction in the deep scan probability as the threat probability approaches the second value.

13. The computer system of claim 1, wherein a higher uncertainty of the threat probability is assigned a higher deep scan probability.

14. A computer-implemented method comprising:

obtaining a data object uploaded to cloud computing storage;

determining a feature of the data object in a feature dimension;

determining a first distance between the data object and a first data object cluster, the first distance based on the feature of the data object and a first object cluster feature in the feature dimension of the first data object cluster;

determining a second distance between the data object and a second data object cluster, the second distance based on the feature of the data object and a second object cluster feature in the feature dimension of the second data object cluster, the first data object cluster and the second data object cluster having been determined from data objects uploaded to the cloud computing storage based on distance between the data objects in the feature dimension, the data objects comprising a first data object known to be malicious and a second data object known to be benign;

assigning a threat score to the data object based on the first distance and the second distance;

determining a deep scan score for the data object utilizing the threat score, wherein the deep scan score is biased against false negatives to favor performing a deep scan on likely-benign files as compared with likely-malicious files;

performing the deep scan on the data object in response to the deep scan score being above a threshold, wherein the deep scan comprises executing code of the data object within an isolated execution environment and analyzing runtime behavior of the code; and responsive to the deep scan indicating the data object is malicious, triggering a cybersecurity response.

15. The method of claim 14, the first data object cluster and the second data object cluster are determined based on distance in the feature dimension.

16. The method of claim 14, wherein a plurality of features of the data object is determined in a plurality of feature dimensions, wherein the first distance and the second distance are determined in the plurality of feature dimensions.

17. The method of claim 14, wherein the first data object cluster is assigned a first tag that indicates if the first data object cluster is malicious or benign, the method comprising:

assigning the threat score to the data object based on the first distance, the second distance and the first tag assigned to the first data object cluster.

18. The method of claim 17, wherein the threat score is assigned to the data object based on the first tag responsive to determining that the first distance is less than the second distance.

19. The method of claim 17, wherein the second data object cluster is assigned a second tag that indicates if the second data object cluster is malicious or benign, wherein the first distance is used to determine a first probability of the data object belonging to the first data object cluster, wherein the second distance is used to determine a second probability of the data object belonging to the second data object cluster, wherein the threat score is assigned based on the first tag, the first probability, the second tag and the second probability.

20. A computer-readable storage medium embodying computer-readable instructions configured, when executed by a processor, to cause the processor to:

determine a first file cluster from files uploaded to a cloud storage medium, the first file cluster determined based on distances between the files in a feature space, the files comprising a file known to be malicious and a file known to be benign;

obtain a first file uploaded to the cloud storage medium;

determine a first feature of the first file in the feature space;

determine a first distance in the feature space between the first file and the first file cluster, the first distance based on the first feature of the first file and a file cluster feature of the first file cluster;

assign a threat probability to the first file based on the first distance between the first file and the first file cluster;

determine a deep scan probability for the first file utilizing the threat probability, wherein the deep scan probability is biased against false negatives to favor performing a deep scan on likely-benign files as compared with likely-malicious files;

perform the deep scan on the first file in response to the deep scan probability being above a threshold, wherein the deep scan comprises executing code of the first file within an isolated execution environment and analyzing runtime behavior of the code; and responsive to the deep scan indicating the first file is malicious, cause a cybersecurity action to be performed.

21. The computer-readable storage medium of claim 20, wherein a first value of the threat probability indicates a benign file and a second value of the threat probability indicates a malicious file, and wherein a reduction in the deep scan probability as the threat probability approaches the first value is less than a reduction in the deep scan probability as the threat probability approaches the second value.

* * * * *